(12) United States Patent
Kubota et al.

(10) Patent No.: US 10,690,253 B2
(45) Date of Patent: Jun. 23, 2020

(54) MULTI-STAGE, MULTI-PATH ROTARY DISC

(71) Applicant: Control Components, Inc., Rancho Santa Margarita, CA (US)

(72) Inventors: Timo Kubota, Rancho Santa Margarita, CA (US); Matthew Wilson, Rancho Santa Margarita, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 165 days.

(21) Appl. No.: 15/628,418

(22) Filed: Jun. 20, 2017

(65) Prior Publication Data

US 2018/0363787 A1    Dec. 20, 2018

(51) Int. Cl.
| | |
|---|---|
| *F16K 1/16* | (2006.01) |
| *F16K 3/08* | (2006.01) |
| *F16K 11/085* | (2006.01) |
| *F16K 11/16* | (2006.01) |
| *F16K 47/08* | (2006.01) |
| *F16K 3/32* | (2006.01) |

(52) U.S. Cl.
CPC .............. *F16K 3/085* (2013.01); *F16K 3/32* (2013.01); *F16K 11/0856* (2013.01); *F16K 11/166* (2013.01); *F16K 47/08* (2013.01)

(58) Field of Classification Search
CPC ........ F16K 3/085; F16K 11/07; F16K 11/074; F16K 3/0209; F16K 3/08; F16K 11/0746; Y10T 137/86928; Y10T 137/86992; Y10T 137/86509; Y10T 137/86533; Y10T 137/86541; Y10T 137/87442
See application file for complete search history.

(56) References Cited

U.S. PATENT DOCUMENTS

| | | | | |
|---|---|---|---|---|
| 1,036,558 | A | * 8/1912 | Butz | ...................... F16K 27/045 |
| | | | | 137/246 |
| 2,941,820 | A | * 6/1960 | Kallis | .................... F16L 29/007 |
| | | | | 137/599.02 |
| 4,625,569 | A | * 12/1986 | Toei | .................... G01N 35/1097 |
| | | | | 73/863.72 |
| 4,665,946 | A | 5/1987 | Hulsey | |

(Continued)

OTHER PUBLICATIONS

Hydroplex Corporation, Lafayette Louisianna. "Hydra Series Choke Valve;" 8 pages.

(Continued)

*Primary Examiner* — Reinaldo Sanchez-Medina
(74) *Attorney, Agent, or Firm* — Stetina Brunda Garred and Brucker; Mark B. Garred

(57) ABSTRACT

A control valve includes a valve body having a main valve passageway. A flow control assembly is positioned in the main valve passageway and includes a first control element, and a second control element rotatable relative to the first control element between a closed position, a first position, and a second position. In the closed position, the first and second control elements form a plug which prevents fluid flow through the main valve passageway. In the first position, the first and second control elements collectively define a first control passageway therethrough, and in the second position, the first and second control elements collectively define the first control passageway and a second control passageway therethrough.

21 Claims, 13 Drawing Sheets

(56) References Cited

U.S. PATENT DOCUMENTS

| | | | |
|---|---|---|---|
| 4,674,537 A * | 6/1987 | Bergmann | F16K 3/085 |
| | | | 137/625.31 |
| 5,074,522 A | 12/1991 | Reynolds et al. | |
| 5,127,438 A * | 7/1992 | Williams | F16K 3/085 |
| | | | 137/562 |
| 5,417,083 A | 5/1995 | Eber | |
| 6,012,488 A * | 1/2000 | Nichols | F16K 11/0743 |
| | | | 137/625.11 |
| 7,726,338 B2 * | 6/2010 | Clasen | F16K 3/085 |
| | | | 137/625.31 |
| 7,802,592 B2 * | 9/2010 | McCarty | F16K 47/08 |
| | | | 137/625.3 |
| 2002/0124895 A1 | 9/2002 | Thiele et al. | |
| 2003/0015245 A1 | 1/2003 | Bender | |
| 2011/0067770 A1 | 3/2011 | Pederson et al. | |
| 2011/0259457 A1 * | 10/2011 | Lin | F16K 3/085 |
| | | | 137/625.46 |
| 2012/0119127 A1 * | 5/2012 | Tower | F16K 3/08 |
| | | | 251/304 |
| 2014/0332103 A1 | 11/2014 | Kwon et al. | |
| 2016/0139094 A1 * | 5/2016 | Hartmann | G01N 30/20 |
| | | | 137/625.46 |
| 2017/0159680 A1 | 6/2017 | Potter et al. | |

OTHER PUBLICATIONS

International Search Report and Written Opinion for PCT/US2018/037877; dated Sep. 7, 2018.

* cited by examiner

MULTI-STAGE, MULTI-PATH ROTARY DISC

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to flow control devices and, more particularly, to a rotationally controlled valve (e.g., a choke) to selectively and incrementally control fluid flow through a valve.

2. Description of the Related Art

In the prior art, one currently know control valve includes a plug or spindle that is linearly displaced during normal operation of the valve. Within these valves, which are often referred to as linear displacement valves, the plug is disposed and moveable within a disc stack or valve cage which defines a multiplicity of tortuous and/or non-tortuous fluid passageways. The valve trim of these valves comprises the combination of the plug and the valve cage. Certain linear displacement valves are configured for "over plug flow" wherein fluid flows radially inward into the interior of the valve cage from the exterior thereof, with the fluid undergoing a pressure drop as a result of the flow through the passageways of the valve cage. In this arrangement, the valve is opened by lifting the plug off a seat ring which thus allows the fluid to flow from the interior of the valve cage and out of the valve via the unblocked seat ring. Conversely, movement of the seating surface of the plug into sealed engagement with the complimentary seating surface of the seat ring facilitates a closed or shut-off condition for the valve.

As an alternative to over plug flow, other linear displacement valves are configured for "under plug flow" wherein fluid flows axially upwardly into the interior of the valve cage to the exterior thereof, with the fluid undergoing a pressure drop as a result of the flow of the fluid radially outwardly through the fluid passageways of the valve cage. In this arrangement, the valve is opened by lifting the plug off of the aforementioned seat ring, which thus allows the fluid to flow into the interior of the valve cage and thereafter radially outwardly through the fluid passageways of the valve cage. Conversely, the movement of the seating surface of the plug into sealed engagement with the complimentary seating surface of the seat ring facilitates a closed or shut-off condition for the valve.

Linear displacement control valves are often used to control flow and pressure in a process. However, such control valves possess certain deficiencies which detract from their overall utility. For instance, linear movement of the valve stem may result in fugitive emissions, particularly in high pressures fluid environments, and when the stem undergoes reciprocating motion. Along these lines, fugitive emissions in chokes is often difficult for because of the high pressures and the reciprocating motion of the stem through the packing.

To avoid the aforementioned deficiencies of linear displacement control valves, rotary disc chokes are sometimes employed in prescribed applications. However, rotary disc chokes currently on the market are single stage devices. These single stage device take the pressure drop on one stage which creates high velocity jets that erode the discs and bodies. They also have an issue at low openings where a sideways directed jet is created that can erode different parts of the bodies and can result in through wall erosion which releases fluid to atmosphere. Other single stage rotary disc chokes cannot provide a characterized Cv vs rotation curve with variable levels of pressure reducing stages at each level. Other disc chokes, such as those of a ¼ turn type, normally use 2 holes on the top disc and 2 on the bottom disc which are revealed at the same time, thus compromising the ability to have fine control.

Accordingly, there is a need in the art for a fluid control valve which allows for selectively opening and closing of the valve while avoiding the aforementioned deficiencies associated with the use of existing linear displacement mechanisms and rotary choke discs. Various aspects of the present disclosure address this particular need, as will be discussed in more detail below.

BRIEF SUMMARY

In general terms, the present disclosure is directed to a new product (referred to herein as a control valve, choke valve, or choke) that utilizes a rotary top disc to reveal DRAG® passages on a stationary bottom disc. One of the unique features of the present disclosure is the ability to incrementally open different numbers of passages and more carefully control the exposure to increased flow. It can be implemented in tungsten carbide materials for erosive services or in metals for more conventional control valve applications. Flow can enter the top rotary disc in an inline body configuration, a y-globe configuration or an angle body configuration. Thus, one of the fundamental innovations of the present disclosure is the creation a rotary disc style DRAG® valve. While, rotary disc devices are common in a single stage pressure let down form, the present disclosure provides a multi-stage, multi-path DRAG® form of the rotary disc design wherein, as indicated above, the choke can have an inline, y-globe, or angle body configuration, and allows flow to enter the top rotary disc. The top rotary disc has inlets that have been shaped to allow for the overlap of flow passages that are in the bottom stationary disc when the top rotary disc is rotated. The passages in the bottom stationary disc may be revealed in rings or sleeves where each ring will reveal flow passages that can have different numbers of DRAG® stages. The bottom stationary disc houses the DRAG® passages which may be arranged in various ways to optimize the overall package size. The shape of the top rotary disc passages are based on the spacing and diameter of the bottom stationary disc passages and allow flow to continue to flow through the bottom disc's passages when new ring passages are revealed. The characteristic or number of stages per ring, number of rings, and diameter of the passages can be adjusted based on capacity and sizing requirements. The geometry of the passages can also be adjusted to created different opening characteristics for each passage. The top rotary disc can be moved by manual manipulation of a handle or the handle can be moved by a rotary actuator and a linkage assembly.

Thus, the design of the valve effectively uses DRAG® multistage passages in place of the single stage bottom stationary disc. The pressure drop is therefore taken over more stages of pressure reduction, reducing fluid velocities, and reducing the rate of erosion, hence increasing the life span of the valve. In this regard, the present disclosure provides a valve design which is a ¼ rotary device that is more effective in passing fugitive emissions testing since the stem is not moving in and out of the packing and is only rotating. For example, the valve constructed in accordance with the present disclosure can provide 6 stages at low openings, 4 stages at intermediates openings, and 2 stages at full open. All levels of staging would be revealed incrementally and at full open all passages would remain open. Thus, the present disclosure provides a multi-stage, multi-path rotary disc type valve which is readily distinguishable from other designs that are single stage. This enables the design of the valve utilizing lower cost pressure boundary components and seals, while also significantly reducing the number of components.

In greater detail, in accordance with one embodiment of the present disclosure, there is provided a control valve or choke valve comprising a valve body having a main valve passageway. A flow control element is positioned within the main valve passageway, with the flow control element having a first stage passageway and a second stage passageway. A rotary disc is positioned in the main valve passageway adjacent the flow control element, the rotary disc having a first stage opening and a second stage opening. The rotary disc is transitional relative to the flow control element between a closed position, a first position, and a second position. In the closed position, the first stage opening and the second stage opening are out of alignment with the first stage passageway and second stage passageway, respectively, such that the rotary disc blocks the first stage passageway and the second stage passageway to prevent fluid flow therethrough. In the first position, the first stage opening is aligned with the first stage passageway and the second stage opening is out of alignment with the second stage passageway, such that the rotary disc allows fluid flow through the first stage passageway and blocks the second stage passageway to prevent fluid flow therethrough. In the second position, the first stage opening is aligned with the first stage passageway and the second stage opening is aligned with the second stage passageway, such that the rotary disc allows fluid flow through both the first stage passageway and the second stage passageway.

The flow control element may include a plurality of first stage passageways and the rotary disc may include a plurality of first stage openings, each first stage opening being associated with a respective one of the plurality of first stage passageways. The flow control element may include a plurality of second stage passageways and the rotary disc may include a plurality of second stage openings, each second stage opening being associated with a respective one of the plurality of second stage passageways. The plurality of first stage openings may extend along a path which is spaced from a central axis by a first radial distance and the plurality of second stage openings may extend along a path which is spaced from the central axis by a second radial distance different from the first radial distance.

The flow control element may include a central body and at least one sleeve extending around the central body and collectively defining the first stage passageway and the second stage passageway. The flow control element may include a plurality of sleeves in nested relation relative to each other. The first stage passageway may be collectively defined by the central body and one of the plurality of sleeves, and the second stage passageway may be collectively defined by adjacent ones of the plurality of sleeves.

The flow control element may include a plurality of stacked discs collectively defining the first stage passageway and the second stage passageway.

According to another embodiment, the control valve or choke valve includes a valve body having a main valve passageway. A flow control assembly is positioned in the main valve passageway and includes a first control element, and a second control element rotatable relative to the first control element between a closed position, a first position, and a second position. In the closed position, the first and second control elements form a plug which prevents fluid flow through the main valve passageway. In the first position, the first and second control elements collectively define a first control passageway therethrough, and in the second position, the first and second control elements collectively define the first control passageway and a second control passageway therethrough.

The flow control assembly may define a plurality of first control passageways when the second control element is in the first position. The flow control assembly may define a plurality of second control passageways when the second control element is in the second position.

The first control element of the flow control assembly may include a central body and at least one sleeve extending around the central body and collectively defining at least a portion of the first control passageway and the second control passageway. The first control element may include a plurality of stacked discs.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a control valve or choke valve and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

According to various aspects of the present disclosure, there is provided a fluid control device for multi-stage fluid pressure control. The fluid control device includes a stationary control element having several stages of passageways formed therein, and a rotatable control element having several stages of inlet openings formed therein and operatively associated with respective ones of the passageways. The rotatable control element is rotatable relative to the stationary control element to selectively move the inlet openings in and out of alignment with the passageways to control fluid flow through the fluid control device. Rotation of the rotatable control element relative to the stationary control element in a first rotational direction gradually aligns respective inlet openings with their corresponding flow passages, and thus incrementally opens different passageways within the stationary control element, which effectively opens such passageways to fluid flow therethrough. Conversely, rotation of the rotatable control element relative to the stationary control element in an opposing second rotational direction gradually moves respective inlet openings out of alignment from the corresponding passageway, which effectively blocks the passageway preventing fluid flow therethrough. Accordingly, by selectively rotating the rotatable control element, a user may control the number of passages through which the fluid may flow. The rotating openings of the rotatable control element may be slightly smaller than the inlet ends of the passageways of the stationary control element to help prevent debris from being trapped in the interface.

Figure 1:
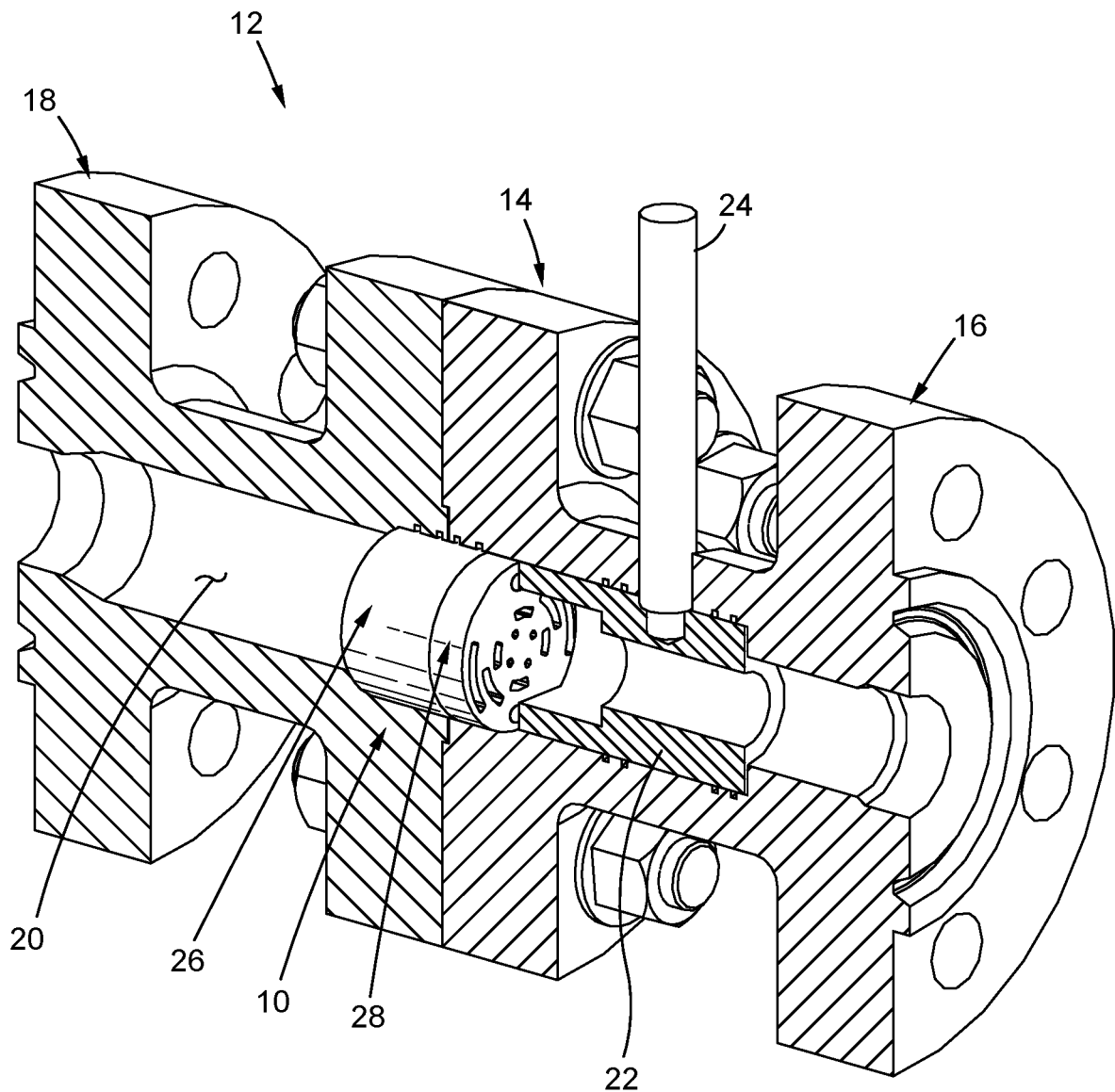
FIG. 1 is a partial cross-sectional, upper perspective, view of a fluid control valve including a first embodiment of a flow control assembly.
Figure 3:
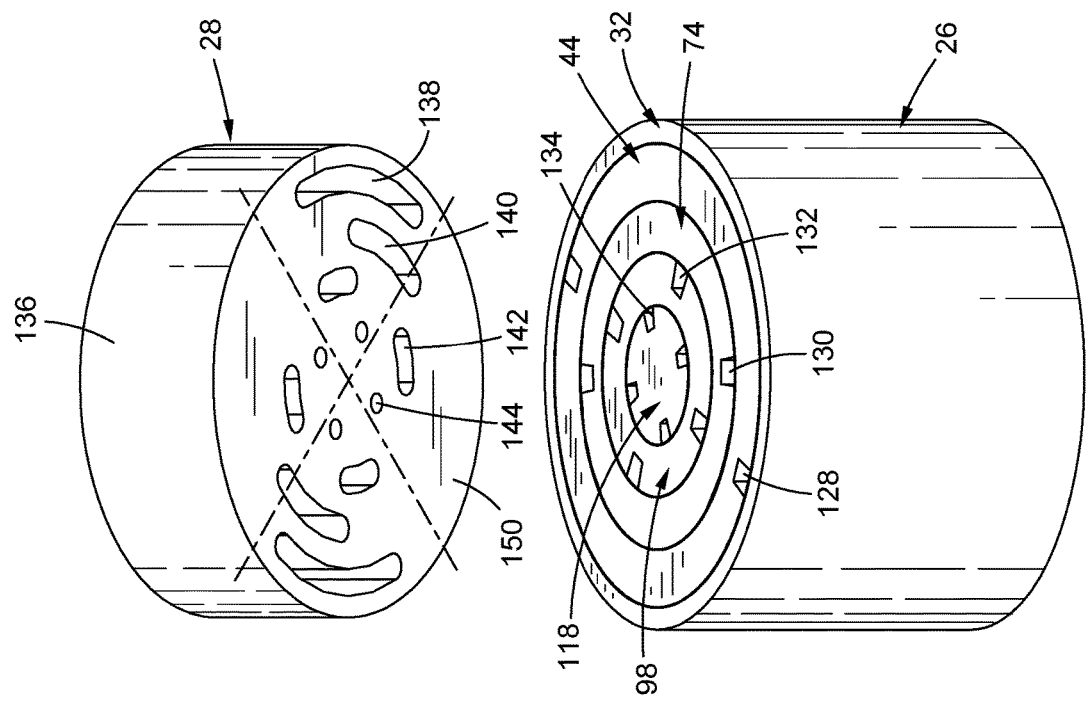
FIG. 3 is a partial exploded view of the flow control assembly depicted in FIG. 2.
Figure 2:
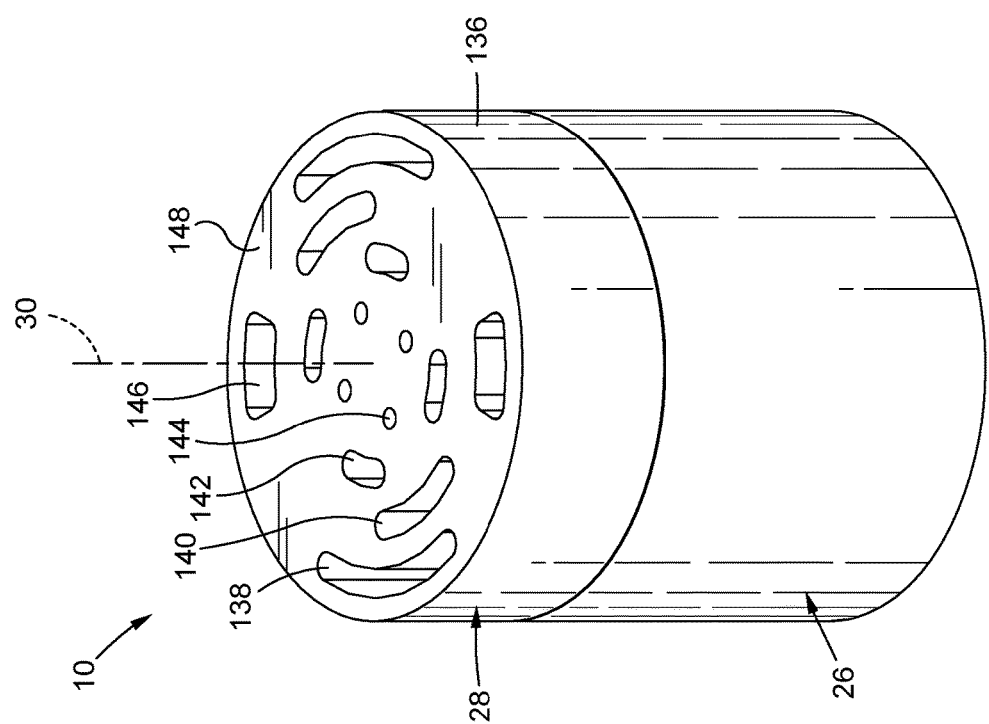
FIG. 2 is an upper perspective view of the flow control assembly depicted in FIG. 1 and including a rotatable and a stationary control element.

Referring now to FIG. 1, a flow control assembly 10 is integrated into a control or choke valve 12 including a valve body 14 having an inlet body 16 and an outlet body 18, which collectively define a main valve passageway 20 extending therethrough. The inlet body 16 defines an inlet portion of the main valve passageway 20 and the outlet body 18 defines an outlet portion of the main valve passageway 20. Disposed within the main valve passageway 20 is a turning fork 22 connected to the flow control assembly 10, with the turning fork 22 having a handle 24 coupled thereto, the purpose of which will be described in more detail below.

The flow control assembly 10 is positioned in the main valve passageway 20 and includes a stationary control element 26 (i.e., a first control element), and a rotatable control element 28 (i.e., a second control element/rotary disc) which is rotatable relative to the first control element 26 between several different positions, each position being associated with a different volume of fluid flow through the flow control assembly 10. The stationary control element 26 includes a plurality of passageways and the rotatable control element 28 includes a plurality of openings, wherein each opening is associated with a corresponding one of the plurality of passageways, such that a given opening and the corresponding passageway collectively define a flow control passageway when the opening is aligned (i.e., overlaps) with the corresponding passageway. It is contemplated that the stationary control element 26 and the rotatable control element 28 may be embodied in several different implementations, as will be discussed in more detail below Referring now to FIGS. 2-7, more detailed views of the flow control assembly 10 are shown. As can be seen, the stationary control element 26 and rotatable control element 28 are both disposed about a central axis 30. The stationary control element 26 is comprised of a plurality of nested rings or sleeves located around a central body, while the rotatable control element 28 is comprised of a rotary disc.

Figure 4:
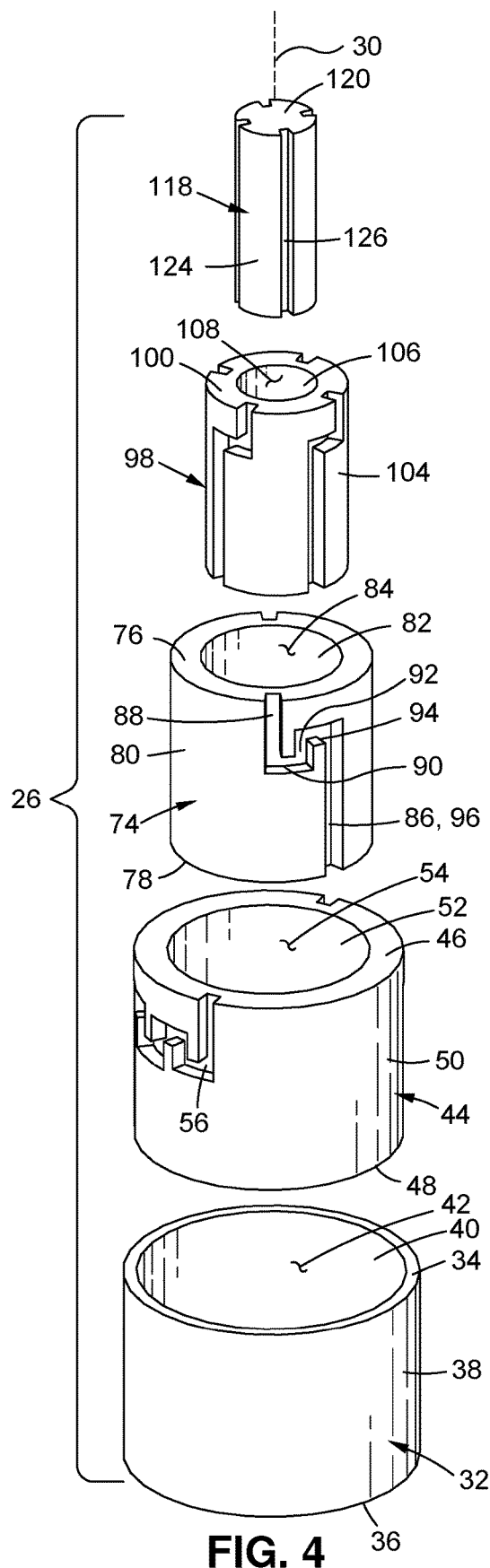
FIG. 4 is an exploded upper perspective view of the stationary control element shown in FIGS. 2 and 3.
Figure 5:
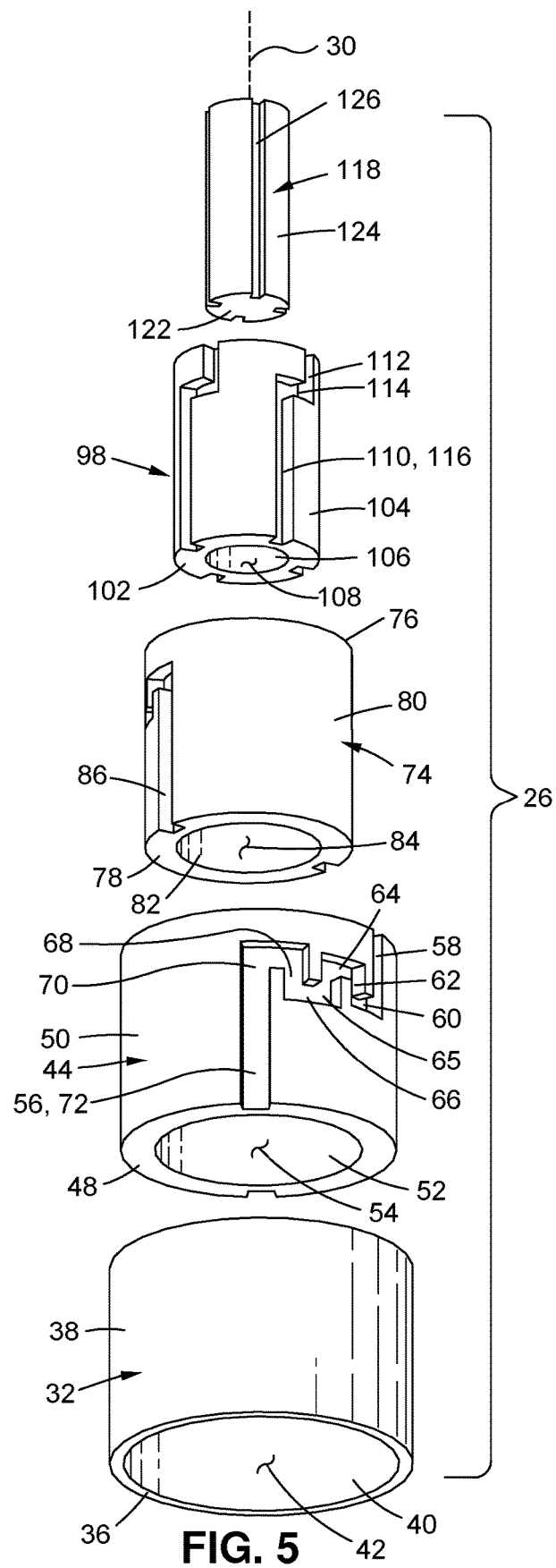
FIG. 5 is an exploded lower perspective view of the stationary control element shown in FIGS. 2 and 3.

In more detail, and referring now specifically to FIGS. 4 and 5, starting at the outer circumference of the stationary control element 26, and moving radially inward, the stationary control element 26 is comprised of a first sleeve 32 including an upper surface 34, a lower surface 36, an outer surface 38, and an inner surface 40 defining a first sleeve opening 42. Both the outer surface 38 and the inner surface 40 extend between the upper surface 34 and lower surface 36, and define an outer diameter and an inner diameter, respectively.

A second sleeve 44 is concentrically positioned within the first sleeve 32 and includes an upper surface 46, a lower surface 48, an outer surface 50, and an inner surface 52 defining a second sleeve opening 54. Both the outer surface 50 and the inner surface 52 extend between the upper surface 46 and lower surface 48, and define an outer diameter and an inner diameter, respectively. The outer diameter of the second sleeve 44 is substantially equal to the inner diameter of the first sleeve 32, such that the second sleeve 55 may be received within the first sleeve opening 42, with the second sleeve outer surface 50 frictionally engaging the first sleeve inner surface 40.

The second sleeve 44 includes two grooves 56 formed therein, with each groove 56 extending into the outer surface 50 and extending completely from the upper surface 46 to the lower surface 48. In the exemplary embodiment, each groove 56 is formed by a pair of opposing sidewalls and a bottom wall extending between the pair of sidewalls. According to one embodiment, the pair of sidewalls are slightly tapered, with the distance between the sidewalls decreasing along the depth of the groove 56. In other words, as the distance from the outer surface 50 increases within the groove 56, the distance between the sidewalls decreases. The grooves 56 are evenly spaced along the circumference of the second sleeve 44 by an increment of 180 degrees.

The grooves 56 formed in the second sleeve 44 each include eight "turns" along the length thereof, meaning that each groove 56 is sized and structured to extend along at least two different axes. In particular, each groove 56 includes a first segment 58, a second segment 60, a third segment 62, a fourth segment 64, a fifth segment 65, a sixth segment 66, a seventh segment 68, an eighth segment 70, and a ninth segment 72. The first, third, fifth, seventh, and ninth segments 58, 62, 65, 68, 72 all extend in a direction generally parallel to the central axis 30, while the second, fourth, sixth and eighth segments 60, 64, 66, 70 extend in a circumferential direction, which is generally perpendicular to the central axis 30. The different segments create the turns within each groove 56, with each pair of adjacent segments defining a respective turn. The tortuous configuration of each groove 56 results in a pressure drop in a fluid flowing through the grooves 56.

A third sleeve 74 is concentrically positioned within the second sleeve 44 and includes an upper surface 76, a lower surface 78, an outer surface 80, and an inner surface 82 defining a third sleeve opening 84. Both the outer surface 80 and the inner surface 82 extend between the upper surface 76 and lower surface 78, and define an outer diameter and an inner diameter, respectively. The outer diameter of the third sleeve 74 is substantially equal to the inner diameter of the second sleeve 44, such that the third sleeve 74 may be received within the second sleeve opening 54, with the third sleeve outer surface 80 frictionally engaging the second sleeve inner surface 52.

The third sleeve 74 includes two grooves 86 formed therein, with each groove 86 extending into the outer surface 80 and extending completely from the upper surface 76 to the lower surface 78. The grooves 86 may have a tapered configuration, as described above in relation to the second sleeve grooves 56. The grooves 86 are evenly spaced along the circumference of the third sleeve 74 by an increment of 180 degrees.

The grooves 86 formed in the third sleeve 74 each include four turns along the length thereof. In particular, each groove 86 includes a first segment 88, a second segment 90, a third segment 92, a fourth segment 94, and a fifth segment 96. The first, third, and fifth segments 88, 92, 96 all extend in a direction generally parallel to the central axis 30, while the second and fourth segments 90, 94 extend in a circumferential direction, which is generally perpendicular to the central axis 30.

A fourth sleeve 98 is concentrically positioned within the third sleeve 74 and includes an upper surface 100, a lower surface 102, an outer surface 104, and an inner surface 106 defining a fourth sleeve opening 108. Both the outer surface 104 and the inner surface 106 extend between the upper surface 100 and lower surface 102, and define an outer diameter and an inner diameter, respectively. The outer diameter of the fourth sleeve 98 is substantially equal to the inner diameter of the third sleeve 74, such that the fourth sleeve 98 may be received within the third sleeve opening 84, with the outer surface of the fourth sleeve 104 frictionally engaging the inner surface 82 of the third sleeve 74.

The fourth sleeve 98 includes four grooves 110 formed therein, with each groove 110 extending into the outer surface 104 and extending completely from the upper surface 100 to the lower surface 102. The grooves 110 may each have a tapered configuration, as described above. The grooves 110 are evenly spaced along the circumference of the fourth sleeve 98 by increments of ninety degrees.

The grooves 110 formed in the fourth sleeve 98 each include two turns along the length thereof. In particular, each groove includes a first segment 112 which extends in a direction parallel to the central axis 30, a second segment 114 which extends in a circumferential direction generally perpendicular to the first segment 112, and a third segment 116 which extends generally parallel to the first segment 112 and the central axis 30.

Central body 118 is an elongate, generally cylindrical body having an upper surface 120, a lower surface 122 and a side surface 124 extending between the upper surface 120 and the lower surface 122, and defining a central body outer diameter. The side surface 124 of the central body 118 is substantially equal to the inner diameter of the fourth sleeve 98, such that the central body 118 is concentrically received within the fourth sleeve opening 108, with the side surface 124 of the central body 118 frictionally engaging the inner surface 106 of the fourth sleeve 98.

Four grooves 126 are formed in the central body 118, with each groove 126 extending into the side surface 124 and extending completely from the upper surface 120 to the lower surface 122. The grooves 126 formed in the central body 118 are axial grooves, meaning they are generally straight, extend along a single axis, and do not have any turns or bends along the length thereof (i.e., from the upper surface 120 to the lower surface 122). The grooves 126 are evenly spaced along the circumference of the central body 118 by increments of ninety degrees.

Figure 6:
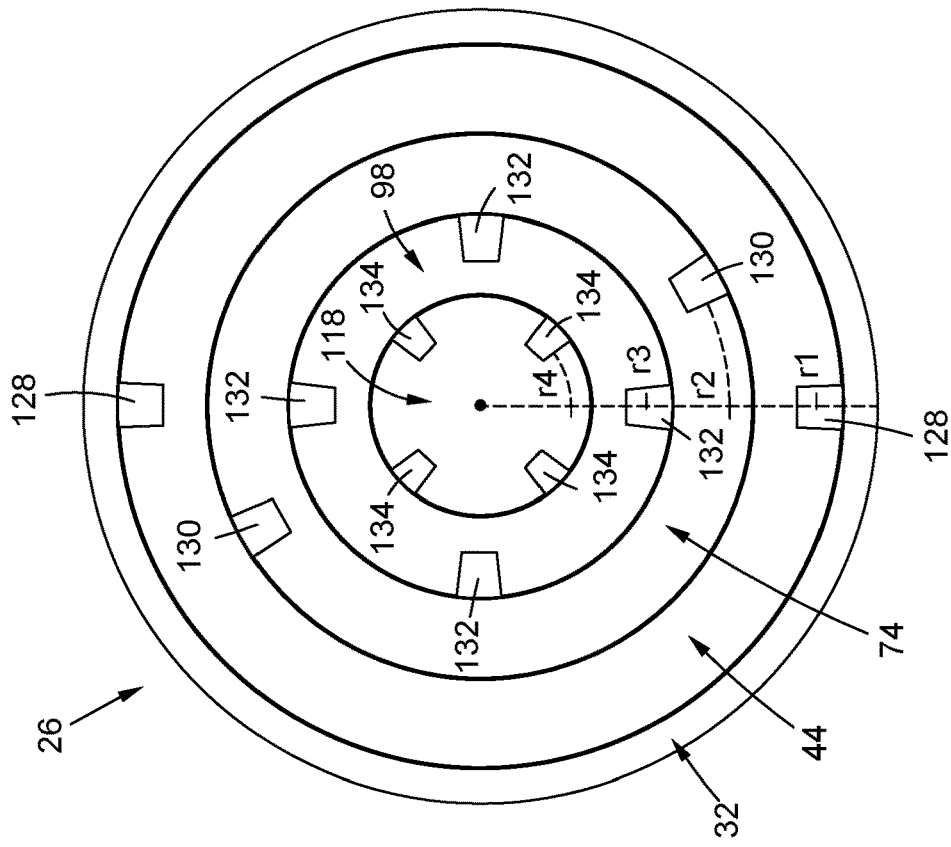
FIG. 6 is a top view of the stationary control element shown in FIGS. 2 and 3.

When the stationary control element 26 is assembled, with the sleeves 32, 44, 74, 98 concentrically nested around the central body 118 as shown in FIG. 6, the stationary control element 26 includes a pair of first stage passageways 128, a pair of second stage passageways 130, four third stage passageways 132, and four fourth stage passageways 134. The first stage passageways 128 are collectively defined by the first sleeve 32 and the second sleeve 44, the second stage passageways 130 are collectively defined by the second sleeve 44 and the third sleeve 74, the third stage passageways 132 are collectively defined by the third sleeve 74 and the fourth sleeve 98, and the fourth stage passageways 134 are collectively defined by the fourth sleeve 98 and the central body 118.

Figure 7:
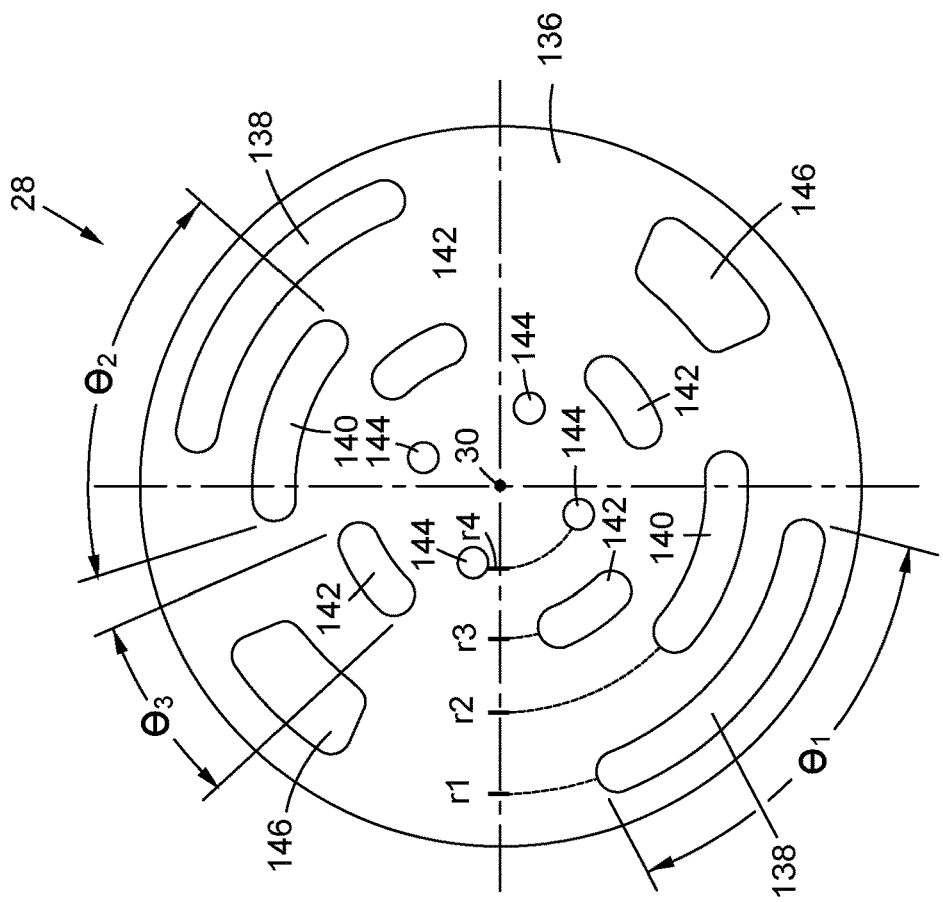
FIG. 7 is a top view of the rotatable control element shown in FIGS. 2 and 3.

Referring now to FIG. 7, an exemplary embodiment of the rotatable control element 28 is shown and includes a disc body 136 having a plurality of openings formed therein and being specifically sized and positioned so as to correspond to certain ones of the passageways formed in the stationary control element 26. In particular, the openings are spaced from the central axis 30 by certain radial distances, relative to the central axis 30, such that the radial spacing between the openings corresponds to the radial spacing between the passageways formed in the stationary control element 26.

Starting from the outer circumference of the disc body 136 and working radially inward, the disc body 136 includes a pair of first stage openings 138 in generally diametrically opposed relation to each other. Each first stage opening 138 extends along a path which is spaced from the central axis 30 by a first radial distance, r1. Each first stage opening 138 also extends about the central axis 30 by a first angular distance 01. The first stage openings 138 correspond to the first stage passageways 128 formed in the stationary control element 26. Each first stage opening 138 defines an area that is larger than that opening of the corresponding first stage passageway 128, the importance of which will be described in more detail below.

Moving radially inward from the first stage opening 138, the disc body 136 further includes a pair of second stage openings 140 in generally diametrically opposed relation to each other. Each second stage opening 140 extends along a path which is spaced from the central axis 30 by a second radial distance r2 less than the first radial distance r1. Each second stage opening 140 also extends about the central axis 30 by a second angular distance Θ2 less than the first angular distance Θ1. The second stage openings 140 correspond to the second stage passageways 130 formed in the stationary control element 26. Each second stage opening 140 defines an area that is larger than that opening of the corresponding second stage passageway 130.

Moving radially inward from the second stage opening 140, the disc body 136 further includes four third stage openings 142 spaced equally about the central axis 30. Each third stage opening 142 extends along a path which is spaced from the central axis 30 by a third radial distance r3 less than the second radial distance r2. Each third stage opening 142 also extends about the central axis 30 by a third angular distance Θ3 less than the second angular distance Θ2. The third stage openings 142 correspond to the third stage passageways 132 formed in the stationary control element 26. Each third stage opening 142 defines an area that is larger than that opening of the corresponding third stage passageway 132.

Moving radially inward from the third stage opening 142, the disc body 136 further includes four fourth stage openings 144 spaced equally about the central axis 30. The fourth stage openings 144 correspond to the fourth stage passageways 134 formed in the stationary control element 26. Each fourth stage opening 144 extends along a path which is spaced from the central axis 30 by a fourth radial distance r4 less than the third radial distance r3. Each fourth stage opening defines an area which is approximately equal to the size of the opening of each fourth stage passageway 134.

Each of the first, second, third, and fourth stage openings 138, 140, 142, 144 extend completely through the disc body between opposing surfaces 148, 150 thereof.

In addition to the first, second, third, and fourth stage openings 138, 140, 142, 144, the disc body 136 further includes a pair of engagement recesses 146, with each engagement recess 146 being sized and positioned to receive a portion of the turning fork 22 to facilitate connection between the turning fork 22 and the rotatable control element 28.

Figure 8A:
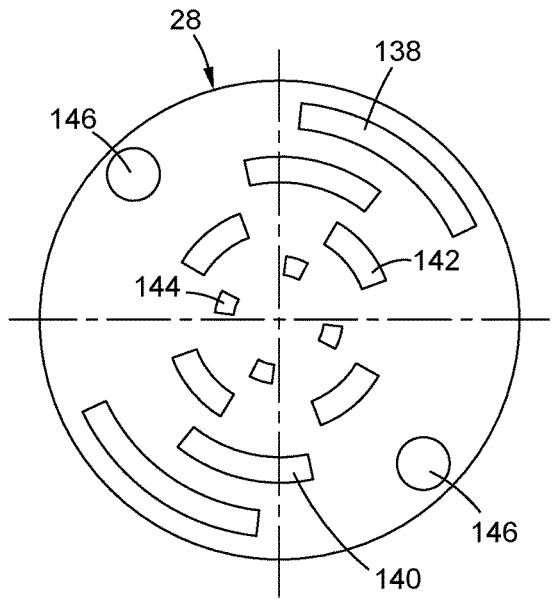
FIGS. 8A-8E are top views depicting sequential rotational positions of the rotatable control element relative to the stationary control element.

Referring now to FIGS. 8A-8E, the various positions of the rotatable control element 28 relative to the stationary control element 26 will now be described. FIG. 8A shows the rotatable control element 28 in a closed position relative to the stationary control element 28. In the closed position, the first stage openings 138, second stage openings 140, third stage openings 142, and fourth stage openings 144 are out of alignment with the corresponding first stage passageways 128, second stage passageways 130, third stage passageways 132, and fourth stage passageways 134. As such, the flow control assembly effectively forms a plug within the main valve passageway 20 by preventing fluid from flowing through any of the first stage passageways 128, second stage passageways 130, third stage passageways 132, and fourth stage passageways 134.

Figure 8B:
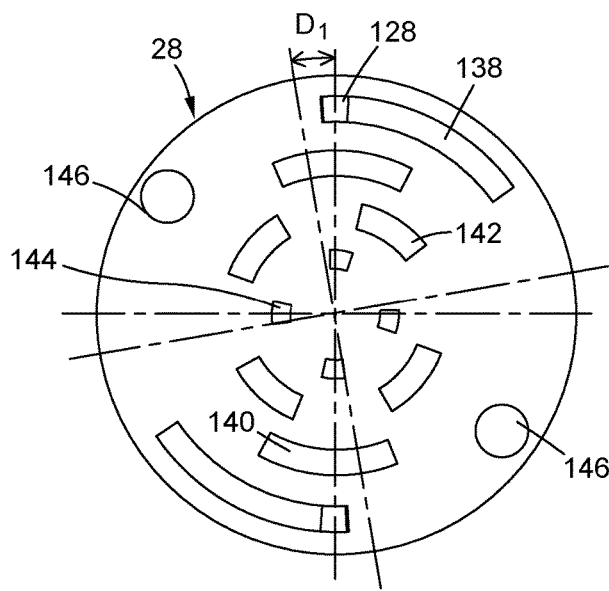

In FIG. 8B, the rotatable control element 28 has been rotated by a first rotational distance D1 relative to the position shown in FIG. 8A, to assume a first open position. In the first open position the first stage openings 138 are at least partially aligned with the openings of the corresponding first stage passageways 128, while the second stage opening 140, third stage opening 142, and fourth stage openings remain out of alignment with the corresponding second stage passageways 130, third stage passageways 132, and fourth stage passageways 134. Thus, when the rotatable control element 28 is in the first open position, fluid can flow through the first stage passageways 128, while fluid is prevented from flowing through the second stage passageways 130, third stage passageways 132, and fourth stage passageways 134.

Figure 8C:
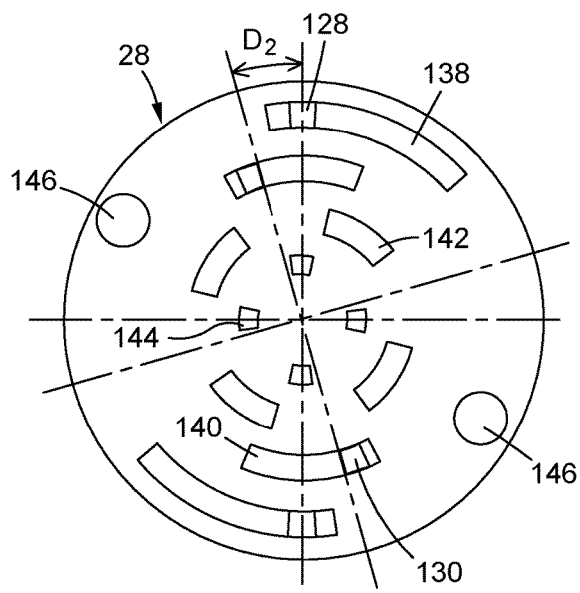

In FIG. 8C, the rotatable control element 28 has been rotated by a second rotational distance D2 relative to the position shown in FIG. 8A, to assume a second open position. In the second open position the first stage openings 138 are aligned with the openings of the corresponding first stage passageways 128 as a result of the extended arclength of the first stage openings 138. Furthermore, when the rotation control element 28 is in the second position, the second stage openings 140 are at least partially aligned with the openings of the corresponding second stage passageways 130. The third stage openings 142 and fourth stage openings 144 remain out of alignment with the corresponding third stage passageways 132, and fourth stage passageways 134. Thus, when the rotatable control element 28 is in the second open position, fluid can flow through the first stage passageways 128 and second stage passageways 130, while fluid is prevented from flowing through the third stage passageways 132, and fourth stage passageways 134.

Figure 8D:
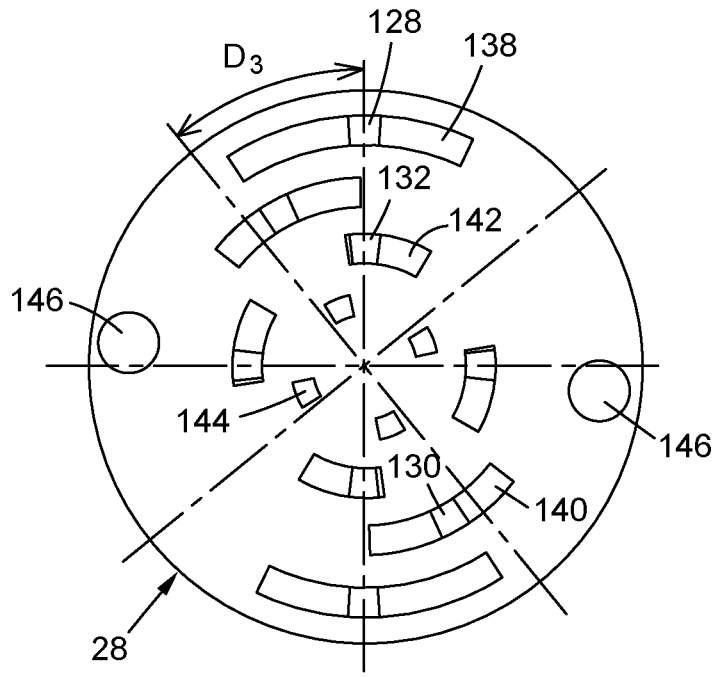

In FIG. 8D, the rotatable control element 28 has been rotated by a third rotational distance D3 relative to the position shown in FIG. 8A, to assume a third open position. In the third open position the first stage openings 138 are aligned with the openings of the corresponding first stage passageways 128, the second stage openings 140 are aligned with the openings of the corresponding second stage passageways 130. Furthermore, the third stage openings 142 are at least partially aligned with the openings of the corresponding third stage passageways 142. The fourth stage openings 144 remain out of alignment with the corresponding fourth stage passageways 134. Thus, when the rotatable control element 28 is in the third open position, fluid can flow through the first stage passageways 128, the second stage passageways 130, and the third stage passageways 132, while fluid is prevented from flowing through the fourth stage passageways 134.

Figure 8E:
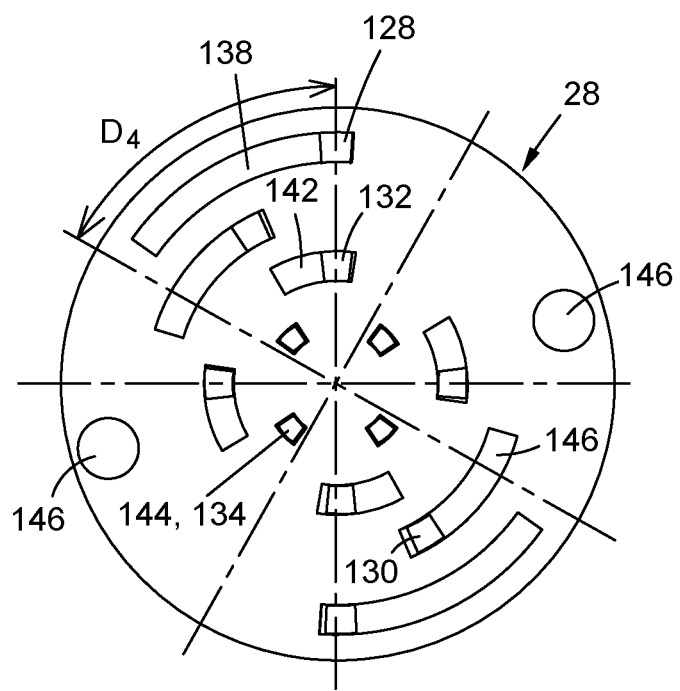

In FIG. 8E, the rotatable control element 28 has been rotated by a fourth rotational distance D4 relative to the position shown in FIG. 8A, to assume a fourth open position. In the fourth open position the first stage openings 138 are aligned with the openings of the corresponding first stage passageways 128, the second stage openings 140 are aligned with the openings of the corresponding second stage passageways 130, and the third stage openings 142 are aligned with the openings of the corresponding third stage passageways 142. Furthermore, the fourth stage openings 144 are at least partially aligned with the corresponding fourth stage passageways 134. Thus, when the rotatable control element 28 is in the fourth open position, fluid can flow through the first stage passageways 128, the second stage passageways 130, the third stage passageways 132, and the fourth stage passageways 134.

According to one embodiment, the rotatable control element 28 can transition from the closed position to the fully opened position (i.e., the fourth open position) through less than ninety degrees of rotation, and in some instances, less than eighty degrees of rotation. Thus, by relatively small degrees of rotation, one can control fluid flow through the flow control assembly 10.

The flow control assembly 10 is specifically designed to allow for opening of the first stage passageways 128, the second stage passageways 130, the third stage passageways 132, and the fourth stage passageways 134 in a radially inward direction. In particular, the first stage passageways 128 are the first to open up, and are at the greatest radial distance from the central axis 30. The second stage passageways 130 open second, followed by the third stage passageways 132, and then the fourth stage passageways 134, in a progressively radially inward direction. In contrast, closing of the passageways occurs in a radially outward direction, with the fourth stage passageways 134 being the first to close, followed by the third stage passageways 132, second stage passageways 130, and finally the first stage passageways 128.

Movement of the rotatable control element 28 relative to the stationary control element 26 may be manually controlled via the handle 24, which can move within a slot formed within the inlet body 16. The handle 24 is interconnected to the rotatable control element 28 through the turning fork 22, and thus, by rotating the handle 24, the rotatable control element 28 is also rotated. It is also contemplated that the rotatable control element may be actuated by a rotary actuator and a linkage assembly.

According to one embodiment, the stationary control element 26 and rotatable control element 28 can be formed from tungsten carbide or other metal materials known in the art. Furthermore, it is contemplated that the control elements 26, 28 can be formed through a laser sintering process, or through the use of green state manufacturing process. An example of a laser sintering process and a green state manufacturing process is described in U.S. Pat. No. 8,826,938, entitled Direct Metal Laser Sintered Flow Control Element, the contents of which are expressly incorporated herein by reference. 3-D printing may also potentially be used to facilitate the fabrication one or both of the control elements 26, 28. In addition, those of ordinary skill in the art will recognize that the foregoing description of the control elements 26, 28, and their manner of flow controlling interaction with each other, is intended to reflect one exemplary optimal implementation, and that certain variants are intended to also be encompassed within the spirit and scope of the present disclosure. By way of example, certain contemplated variations include, but are not limited to: 1) variations in the size (e.g., length and/or diameter) and/or number of concentrically positioned sleeves included in the stationary control element 26; 2) variations in the geometry (e.g., size, shape and/or depth), arrangement and/or number of first, second, third and/or fourth stage passageways 128, 130, 132, 134; 3) variations in the size (e.g., length and/or diameter) of the rotatable control element 28; and 4) variations in the geometry (e.g., size, shape and/or depth), arrangement and/or number of first, second, third and fourth stage openings 138, 140, 142, 144. As will be recognized, the implementation of any of these variations in any combination may be occasioned by prescribed choke valve performance criteria.

Figure 9:
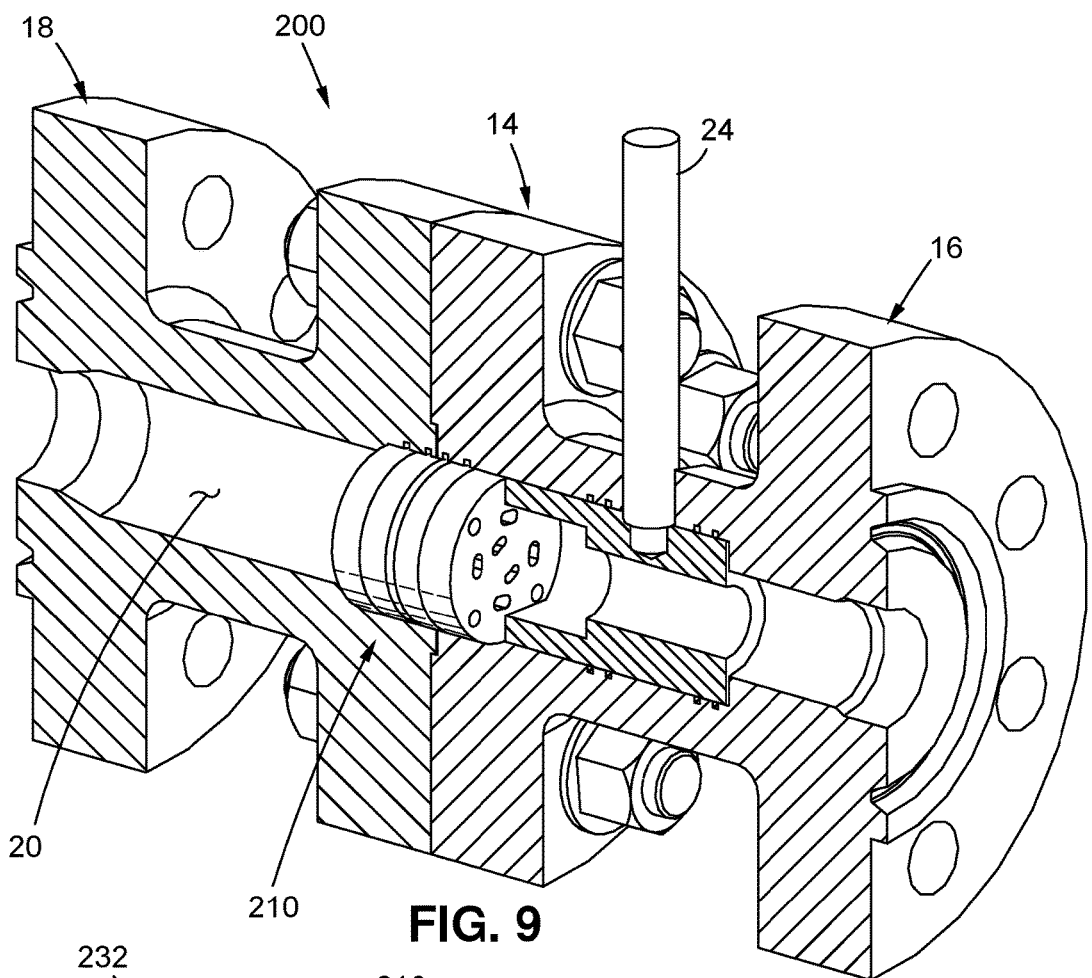
FIG. 9 is a partial cross sectional, upper perspective, view of a fluid control valve including a second embodiment of a flow control assembly.
Figure 10:
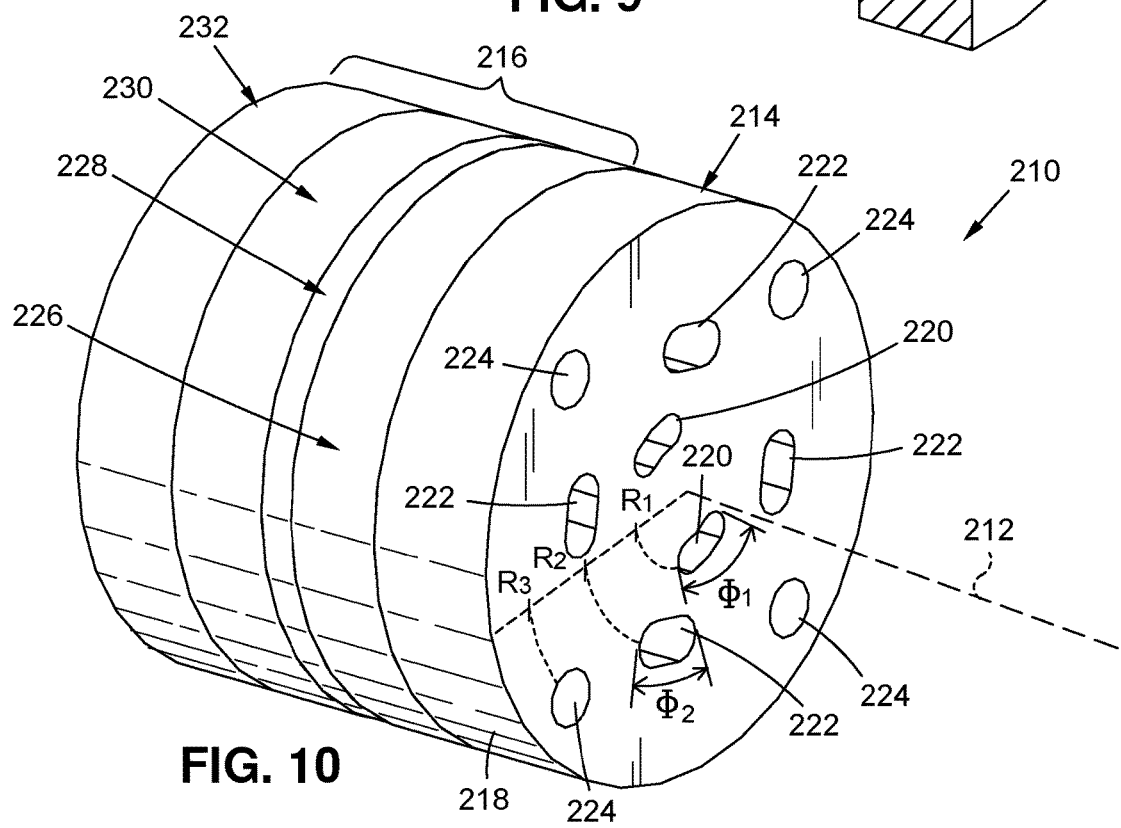
FIG. 10 is an upper perspective view of the flow control assembly depicted in FIG. 9.

Referring now to FIG. 9, there is depicted another control or choke valve 200 including a second exemplary embodiment of the flow control assembly 210. FIG. 10 is an upper perspective view of the flow control assembly 210 disposed about a central axis 212 and generally including a rotatable control element 214 (e.g., a rotary disc) and a stationary control element 216 comprised of a plurality of stacked discs. When assembled, the stationary control element 216 and the rotatable control element 214 form a disc stack comprised of discs that are similar in circumference or diameter, and which can reside in the main passageway 20 of the control valve 200. The stationary control element 216 and rotatable control element 214 collectively define a plurality of control passageways that are selectively opened and closed via relative rotation of the rotatable control element 214 relative to the stationary control element 216.

The rotatable control element 214 is disposed about the central axis 212 and includes a disc body 218 having a plurality of openings formed therein. In particular, starting from the central axis 212 and moving radially outward toward the outer circumference, the disc body 218 includes a pair of first stage openings 220 in generally opposed relation to each other. Each first stage opening 220 extends along a path which is spaced from the central axis 212 by a first radial distance R1. Each first stage opening 220 also extends about the central axis by a first angular distance $\Phi 1$. The first stage openings 220 correspond to a first stage passageway formed in the stationary control element 216. Each first stage opening 220 defines an area that is larger than that opening of the corresponding first stage passageway, the importance of which will be described in more detail below.

Moving radially outward from the first stage openings 220, the disc body 218 further includes four second stage openings 222 spaced equally about the central axis 212. Each second stage opening 222 extends along a path which is spaced from the central axis 212 by a second radial distance R2 greater than the first radial distance R1. Each second stage opening 222 also extends about the central axis 212 by a second angular distance $\Phi 2$ less than the first angular distance $\Phi 1$. The second stage openings 222 correspond to second stage passageways formed in the stationary control element 216. Each second stage opening 222 defines an area that is larger than that opening of the corresponding second stage passageway.

Moving radially outward from the second stage opening 222, the disc body 218 further includes four third stage openings 224 spaced equally about the central axis 212. The third stage openings 224 correspond to third stage passageways formed in the stationary control element 216. Each third stage opening 224 extends along a path which is spaced from the central axis 212 by a third radial distance R3 greater than the second radial distance R2. Each third stage opening 224 defines an area which is approximately equal to the size of the opening of each third stage passageway.

The disc body 218 may also include one or more engagement recesses or openings to facilitate engagement with the turning fork, as described above.

Figure 11:
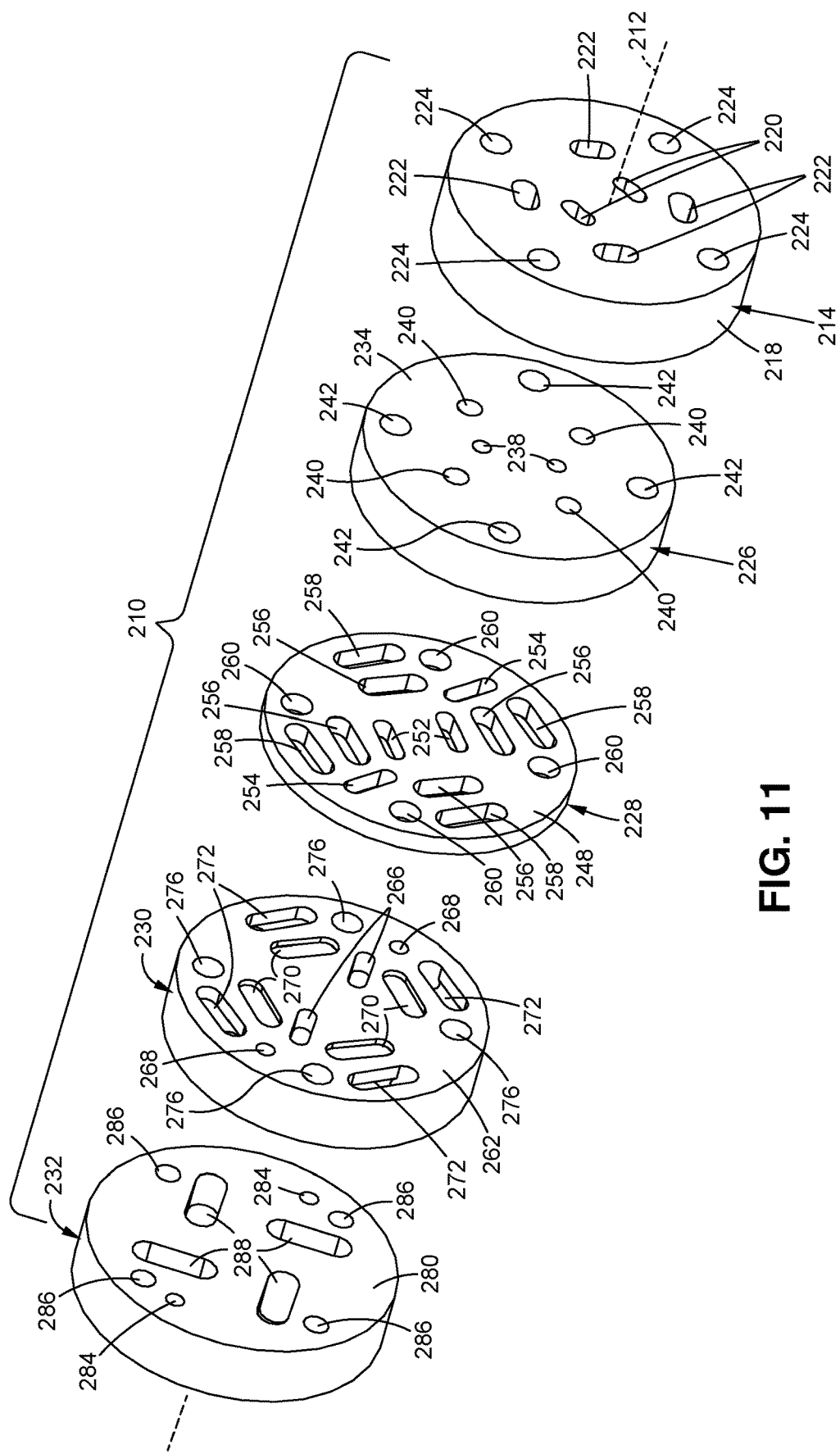
FIG. 11 is an exploded, first side, upper perspective view of the flow control assembly depicted in FIG. 10.
Figure 12:
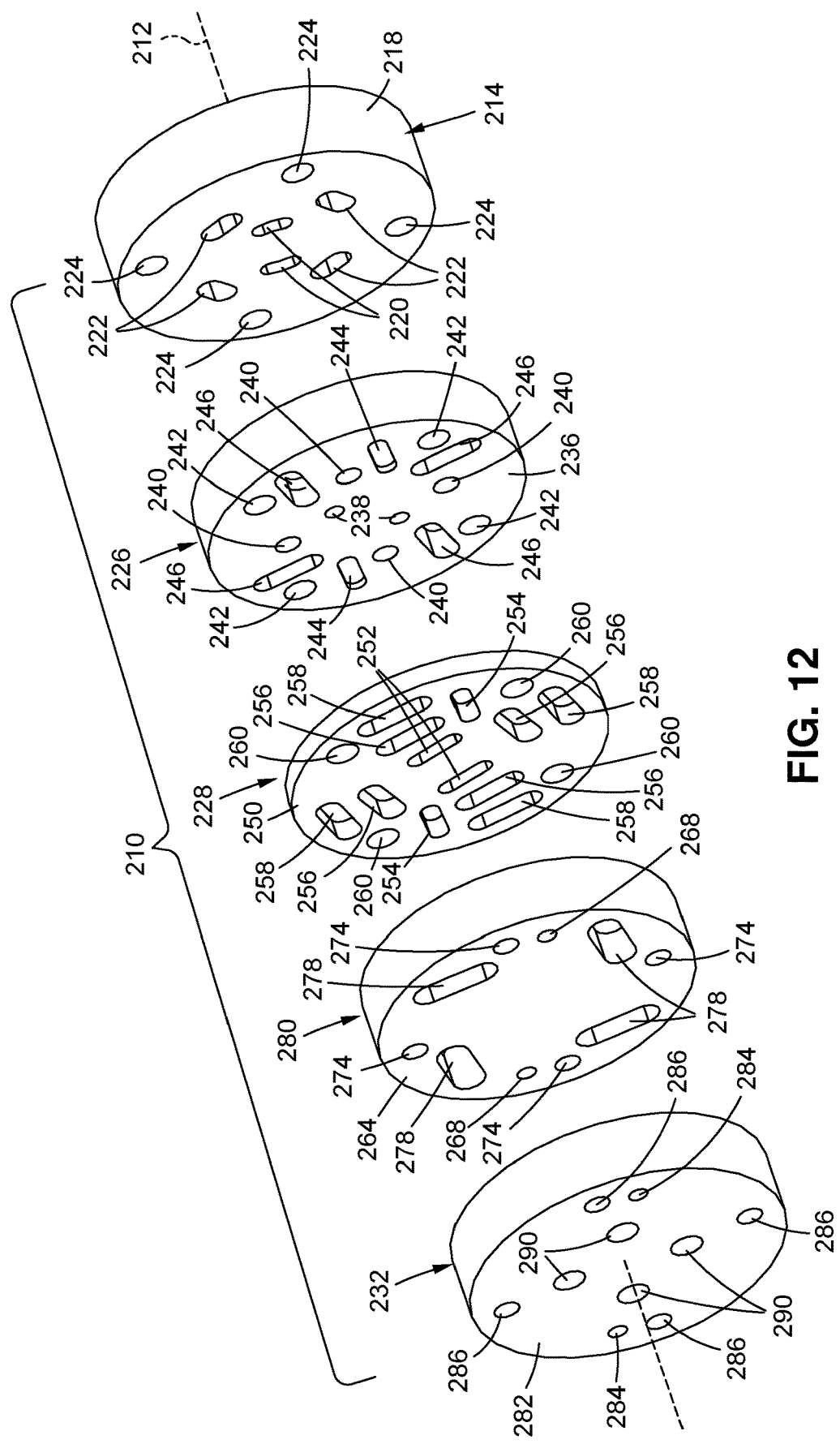
FIG. 12 is an exploded, second side, upper perspective view of the flow control assembly depicted in FIG. 10.

FIGS. 11 and 12 are exploded view of the flow control assembly 210, and when viewed from the perspectives illustrated therein, the rotatable control element 214 is depicted on the right side, and the discs comprising the stationary control element 216 (e.g., the stationary discs) are to the left of the rotatable control element 214. The rotatable control element 214 is upstream of the stationary discs, such that fluid initially enters the rotatable control element 214 before flowing through the stationary discs.

The stationary control element 216 includes four discs, including a first disc 226 adjacent the rotatable control element 214, followed by a second disc 228, a third disc 230, and a fourth disc 232. The first, second, third, and fourth discs 226, 228, 230, 232 include a plurality of openings and recesses which collectively define a pair of first stage passageways, four second stage passageways, and four third stage passageways.

The first disc 226 includes a first side 234 facing the rotatable control element 214, and an opposing second side 236 facing away from the rotatable control element 214. A pair of first stage openings 238 are formed in the first disc 226 and extend completely from the first side 234 to the second side 236. The pair of first stage openings 238 are each spaced from the central axis 212 by a first radial distance and are aligned along a common diameter. Four second stage openings 240 are also formed in the first disc 226 and extend completely from the first side 234 to the second side 236. The second stage openings 240 are each spaced from the central axis 212 by a second radial distance greater than the first radial distance. Four third stage openings 242 are also formed in the first disc 226 and extend completely from the first side 234 to the second side 236. The third stage openings 242 are each spaced from the central axis 212 by a third radial distance greater than the second radial distance.

Referring now specifically to FIG. 12, the first disc 226 additionally includes a plurality of recesses which extend into the first disc 226 from the second side 236. The recesses do not extend completely from the second side 236 to the first side 234; rather, they terminate short of the first side 234 to define an intermediate surface between the first and second sides 234, 236. In particular, the first disc 226 includes a pair of first stage recesses 244, and four second stage recesses 246. Each first stage recess 244 forms part of a respective first stage passageway, while each second stage recess 246 forms part of a respective second stage passageway, as will be described in more detail below. The size and spacing of the first and second stage recesses 244, 246 allow the recesses 244, 246 to communicate with corresponding openings or recesses in the adjacent second disc 228.

The second disc 228 is positioned adjacent the first disc 226 and includes a first side 248 facing toward the first disc 226, an opposing second side 250 facing away from the first disc 226, and a plurality of openings extending completely between the first side 248 and the second side 250. Each opening forms a portion of one of the first stage passageway, the second stage passageway, and the third stage passageway. In particular, the second disc 228 includes a pair of first stage primary openings 252 and a pair of first stage secondary openings 254, each of which contribute to respective ones of the pair of first stage passageways. Each first stage primary opening 252 is upstream of a corresponding one of the pair of first stage secondary openings 254. The second disc 228 also includes four second stage primary openings 256 and four second stage secondary openings 258, each of which contribute to respective ones of the four second stage passageways. Each second stage primary opening 256 is upstream of a corresponding one of the four second stage secondary openings 258. The second disc 228 further includes four third stage openings 260, each of which form portions of respective ones of the third stage passageways.

The third disc 230 is disposed adjacent the second disc 228 and includes a first side 262 and an opposing second side 264, with the first side 262 facing toward the second disc 228 and the second side 264 facing away from the second disc 228. The third disc 230 includes a pair of first stage recesses 266 extending partially through the third disc 230 from the first side 262 toward the second side 264. Each first stage recess 266 is sized and positioned to be in communication with a first stage primary opening 252 and a first stage secondary opening 254 on the second disc 228. The third disc 230 additionally includes a pair of first stage openings 268 extending completely between the first side 262 and the second side 264. Each first stage opening 268 is sized and positioned to be in communication with a corresponding first stage secondary opening 254 on the second disc 228.

The third disc 230 additionally includes four second stage primary recesses 270, four second stage secondary recesses, 272 and four second stage openings 274 associated with respective ones of the second stage passageways. Each second stage primary recess 270 and each second stage secondary recess 272 extends partially through the third disc 230 from the first side 262 to the second side 264. Each second stage opening 274 is formed at the end of a respective second stage secondary recess 272 and extends completely between the first side 262 and the second side 264. Each second stage primary recess 270 is sized and positioned to be in communication with a corresponding second stage primary opening 256 of the second disc 228. Each second stage secondary recess 272 is sized and positioned to be in communication with a corresponding second stage secondary opening 258 of the second disc 228.

The third disc 230 further includes four third stage openings 276 and four third stage recesses 278. Each third stage opening 276 extends completely from the first side 262 to the second side 264, and is in communication with a respective third stage opening 276 on the third disc 230. Each third stage recess 278 is in communication with a respective third stage opening 276 and extends away from the corresponding third stage opening 276. Each third stage recess 278 extends partially through the third disc 230 from the second side 264 toward the first side 262.

The fourth disc 232 is positioned adjacent the third disc 230 and includes a first side 280 and an opposing second side 282, with the first side 280 facing toward the third disc 230 and the second side 282 facing away from the third disc 230. The fourth disc 232 includes a pair of first stage openings 284 extending completely through the fourth disc 232 from the first side 280 to the second side 282. Each first stage opening 284 is in communication with a corresponding first stage opening 268 formed on the third disc 230. The fourth disc 232 additionally includes four second stage openings 284 extending completely through the fourth disc 232 from the first side 280 to the second side 282. Each second stage opening 284 is in communication with a corresponding second stage opening 274 formed on the third disc 230. The fourth disc 232 further includes four third stage recesses 288 and four third stage openings 290. Each third stage recess 288 extends partially through the fourth disc 232 from the first side 280 toward the second side 282, and is in communication with a corresponding third stage recess 278 formed on the third disc 230.

Figure 13:
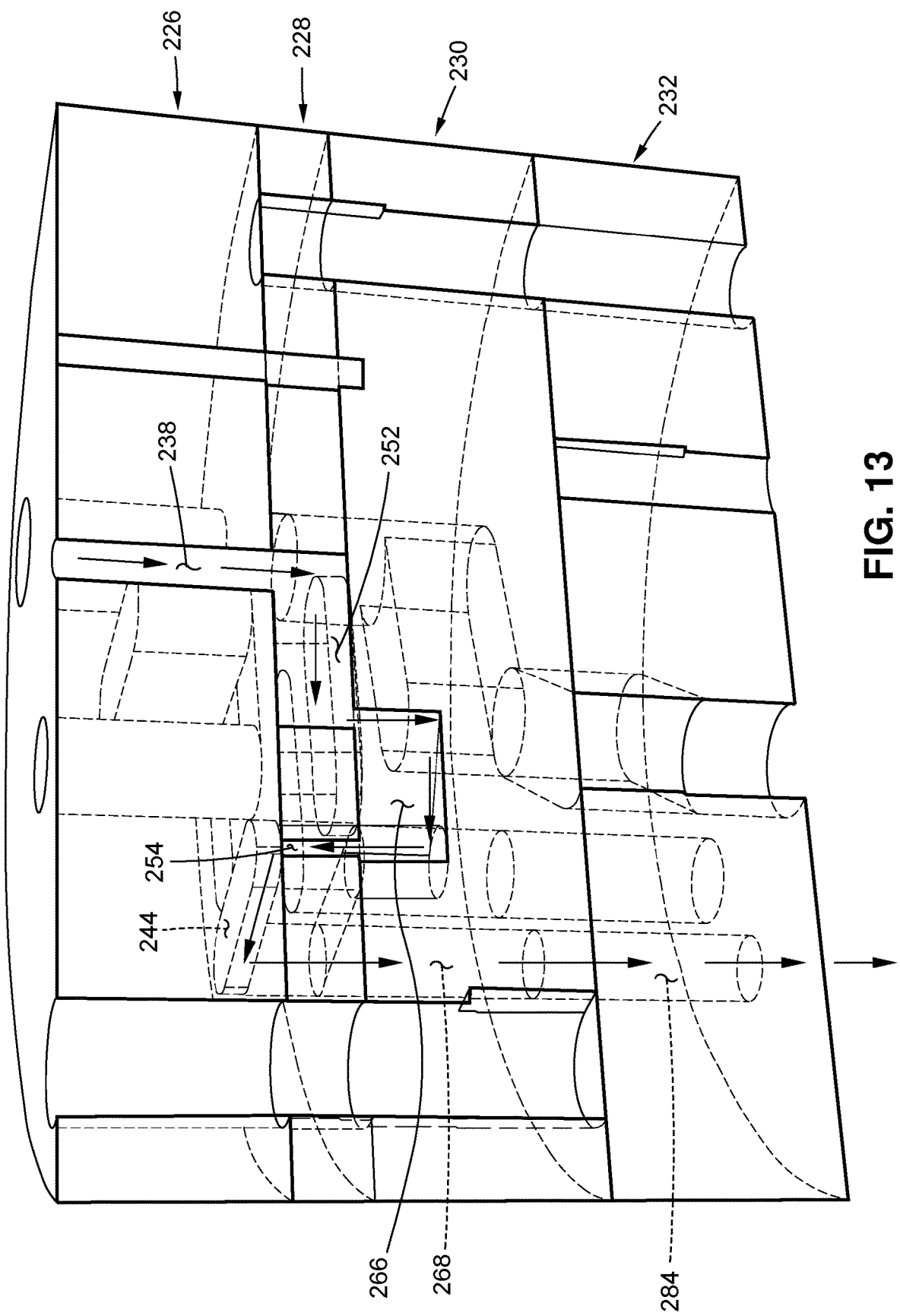
FIG. 13 is an upper perspective, cross sectional view illustrating a first control passageway through the flow control assembly depicted in FIG. 10.

As noted above, the first, second, third and fourth discs 226, 228, 230, 232 collectively define the first stage passageway, second stage passageway and third stage passageway. Referring now to FIG. 13, a cross-sectional, perspective view of the stationary control element 214 is shown with certain openings and recesses thereof being depicted in phantom to illustrate an exemplary one of the first stage passageways. As fluid flows through the first stage passageway, the fluid flows through the first stage opening 238 in the first disc 226, then through the first stage primary opening 252 in the second disc 228, then through the first stage recess 266 in the third disc 230, then through the first stage secondary opening 254 and first stage recess 244 in the second and first discs 228, 226, respectively, and then through aligned first stage openings 268, 284 in the third and fourth discs 230, 232. In this regard, the first stage passageway extends along three different axes, and includes seven segments and six turns.

Figure 14:
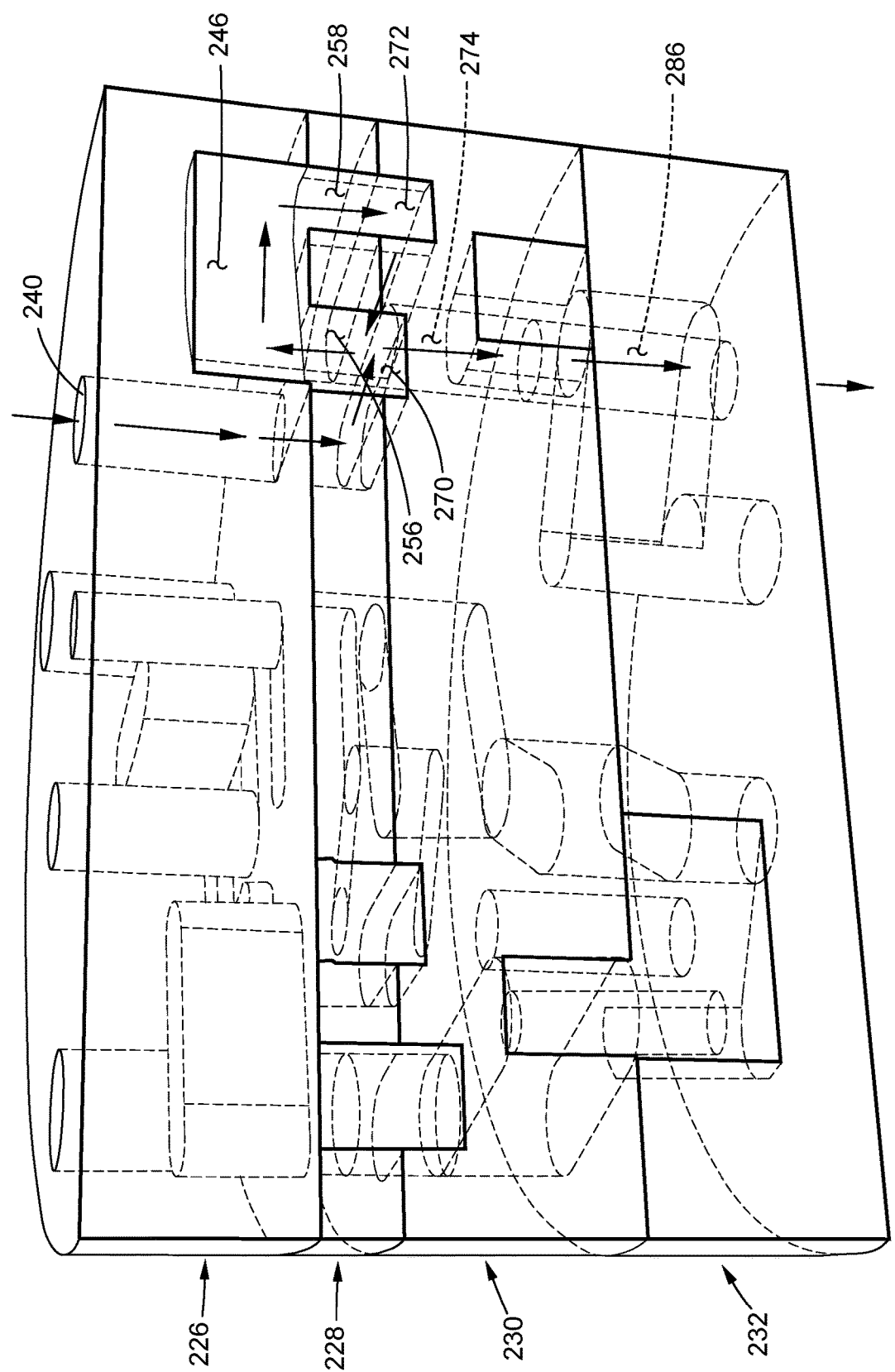
FIG. 14 is an upper perspective, cross-sectional view illustrating a second control passageway through the flow control assembly depicted in FIG. 10.

Referring now to FIG. 14, an exemplary second stage passageway is depicted. As fluid flows through the second stage passageway, the fluid flows through the second stage opening 240 in the first disc 226, through the second stage primary opening 256 and the second stage primary recess 270 in the second and third discs 228, 230, respectively, through the second stage recess 246 in the first disc 226, through the second stage secondary opening 258 and the second stage secondary recess 272 in the second and third discs 228, 230, respectively, through the second stage opening 274 in the third disc 230, and through the second stage opening 286 in the fourth disc 232. In this regard, the second stage passageway extends along three different axes, and includes seven segments and six turns.

Figure 15:
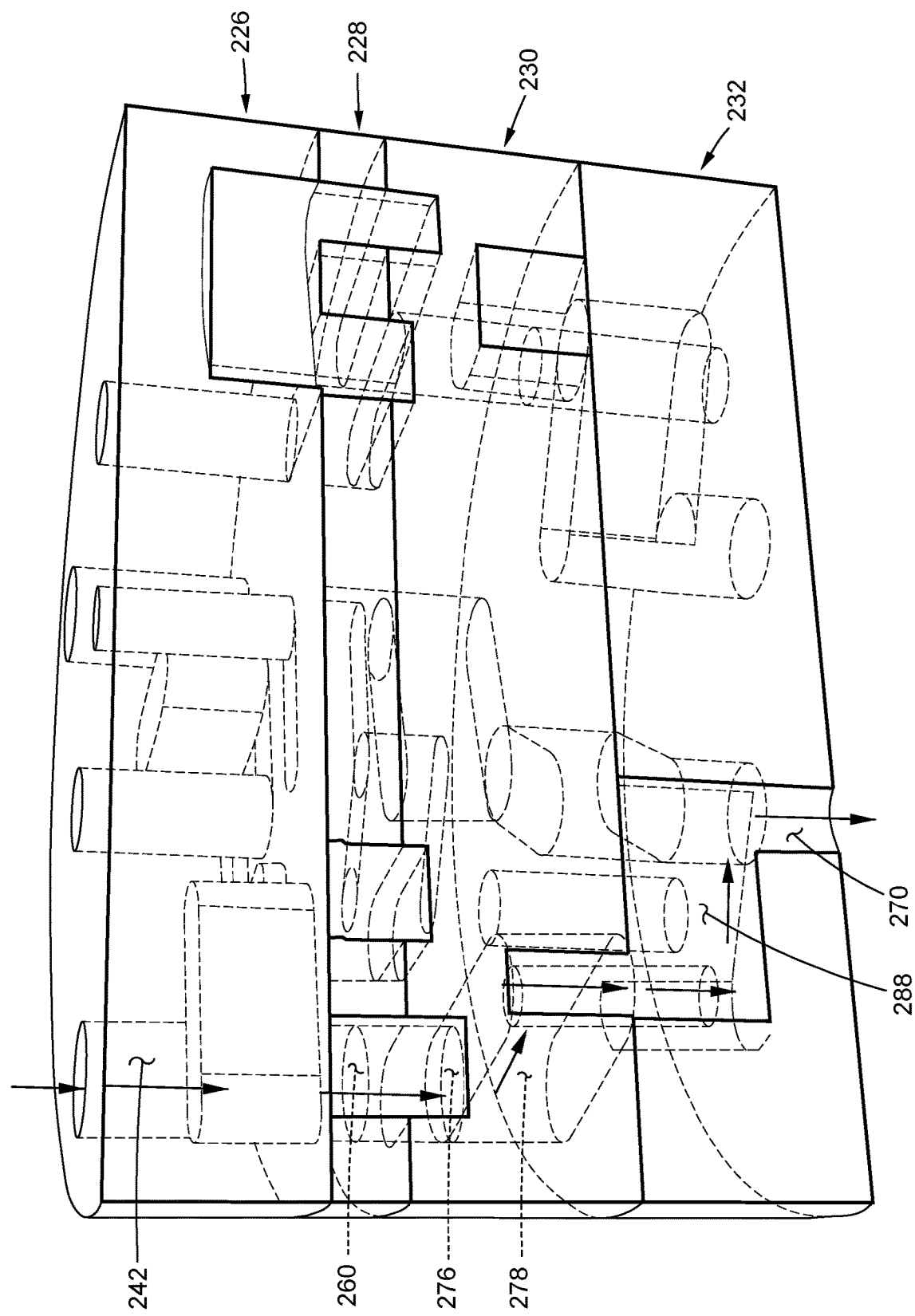
FIG. 15 is an upper perspective, cross-sectional view illustrating a third control passageway through the flow control assembly depicted in FIG. 10.

Referring now to FIG. 15, an exemplary third stage passageway is depicted. As fluid flows through the third stage passageway, the fluid flows through the third stage opening 242 in the first disc 226, through the third stage opening 260 in the second disc 228, through the third stage opening 276 and the third stage recess 278 in the third disc 230, through the third stage recess 288 in the fourth disc 232, and through the third stage opening 290 in the fourth disc 232. In this regard, the third stage passageway extends along three different axes, and includes five segments and six turns.

Figure 16A:
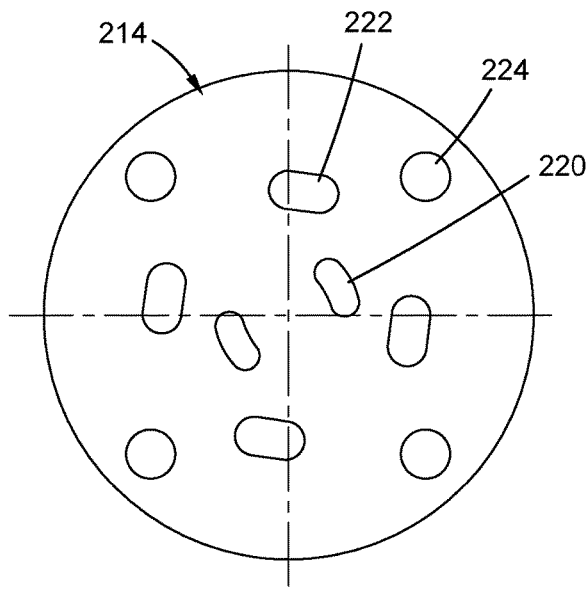
FIGS. 16A-D are top views depicting sequential rotational positions of the rotatable control element relative to the stationary control element.

Referring now to FIGS. 16A-16D, the various positions of the rotatable control element 214 relative to the stationary control element 216 will now be described. FIG. 16A shows the rotatable control element 214 in a closed position relative to the stationary control element 216. In the closed position, the first stage openings 220, second stage openings 222, and third stage openings 224 are out of alignment with the corresponding openings of the first stage passageways, the second stage passageways, and the third stage passageway. As such, the flow control assembly 210 effectively forms a plug within the main valve passageway 20 by preventing fluid from flowing through any of the first stage passageways, second stage passageways, and third stage passageways.

Figure 16B:
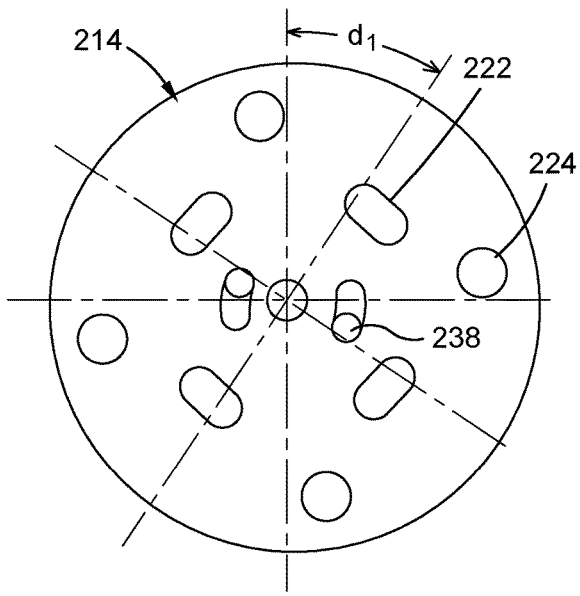

In FIG. 16B, the rotatable control element 214 has been rotated by a first rotational distance d1 relative to the position shown in FIG. 16A, to assume a first open position. In the first open position the first stage openings 220 of the rotatable control element 214 are at least partially aligned with corresponding ones of the first stage openings 238 on the first disc 226, while the second stage openings 222 and third stage openings 224 remain out of alignment with their corresponding second stage openings 240 and third stage openings 240 on the first disc 226. Thus, when the rotatable control element 214 is in the first open position, fluid can flow through the first stage passageways, while fluid is prevented from flowing through the second stage passageways and third stage passageways.

Figure 16C:
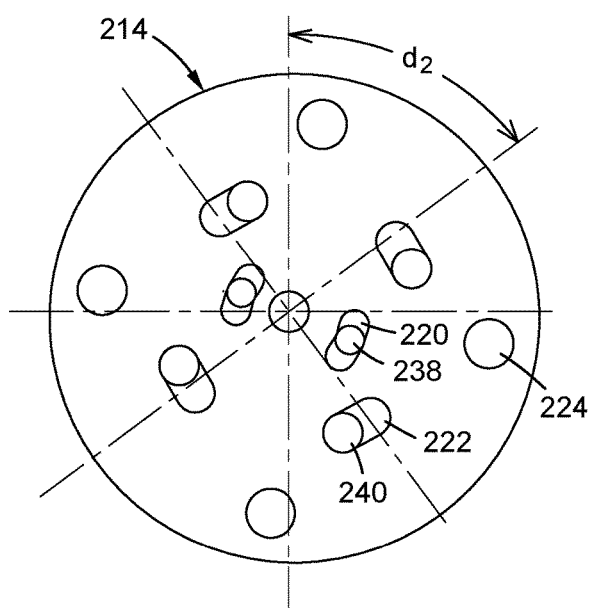

In FIG. 16C, the rotatable control element 214 has been rotated by a second rotational distance d2 relative to the position shown in FIG. 16A, to assume a second open position. In the second open position the first stage openings 220 of the rotatable control element 214 are aligned with the first stage openings 238 on the first disc 226 as a result of the extended arclength of the first stage openings 220. Furthermore, when the rotation control element 214 is in the second position, the second stage openings 222 of the rotatable control element 214 are at least partially aligned with the second stage openings 240 of the first disc 226. The third stage openings 224 of the rotatable control element 214 remain out of alignment with the corresponding third stage openings 242 of the first disc 226. Thus, when the rotatable control element 214 is in the second open position, fluid can flow through the first stage passageways and second stage passageways, while fluid is prevented from flowing through the third stage passageways.

Figure 16D:
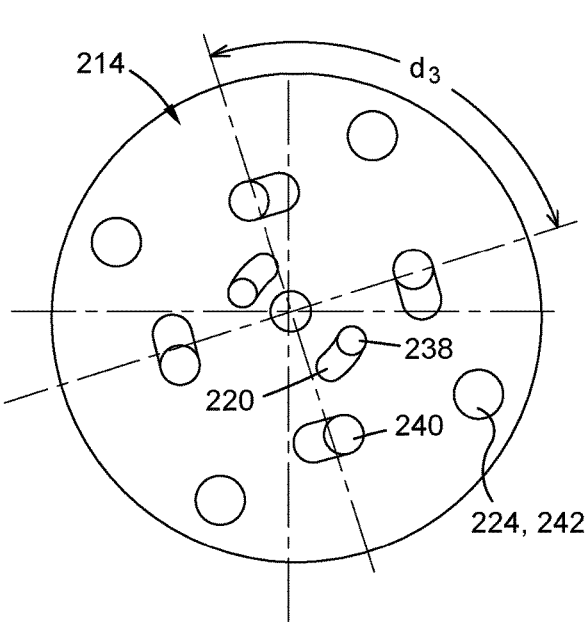

In FIG. 16D, the rotatable control element 214 has been rotated by a third rotational distance d3 relative to the position shown in FIG. 16A, to assume a third open position. In the third open position the first stage openings 220 of the rotatable control element 214 are aligned with the first stage openings 238 on the first disc 226, and the second stage openings 222 of the rotatable control element 214 are aligned with the second stage openings 240 of the first disc 226. Furthermore, the third stage openings 224 of the rotatable control element 214 are at least partially aligned with the corresponding third stage openings 242 of the first disc 226. Thus, when the rotatable control element 214 is in the third open position, fluid can flow through the first stage passageways, the second stage passageways, and the third stage passageways.

According to one embodiment, the rotatable control element 214 can transition from the closed position to the fully opened position (i.e., the third open position) through less than ninety degrees of rotation, and in some instances, less than eighty degrees of rotation. Thus, by relatively small degrees of rotation, one can control fluid flow through the flow control assembly 210.

The flow control assembly 210 is specifically designed to allow for opening of the first stage passageways, the second stage passageways, and the third stage passageways in a radially outward direction. In particular, the first stage passageways are the first to open up, and are at the smallest radial distance from the central axis 212. The second stage passageways open second, followed by the third stage passageways in a progressively radially outward direction. In contrast, closing of the passageways occurs in a radially inward direction, with the third stage passageways being the first to close, followed by the second stage passageways, and finally the first stage passageways.

According to one embodiment, the stationary control element 216 and rotatable control element 214 can be formed from tungsten carbide or other metal materials known in the art. Furthermore, it is contemplated that the control elements 214, 216 can be formed through a laser sintering process, or through the use of green state manufacturing process. An example of a laser sintering process and a green state manufacturing process is described in U.S. Pat. No. 8,826,938, entitled Direct Metal Laser Sintered Flow Control Element, the contents of which are expressly incorporated herein by reference. 3-D printing may also potentially be used to facilitate the fabrication one or both of the control elements 214, 216. In addition, those of ordinary skill in the art will recognize that the foregoing description of the control elements 214, 216, and their manner of flow controlling interaction with each other, is intended to reflect one exemplary optimal implementation, and that certain variants are intended to also be encompassed within the spirit and scope of the present disclosure. By way of example, certain contemplated variations include, but are not limited to: 1) variations in the size (e.g., length and/or diameter) and/or number of discs included in the stationary control element 216; 2) variations in the geometry (e.g., size, shape and/or depth), arrangement and/or number of openings and/or recesses included in any one or more of the discs 226, 228, 230, 232 and/or rotatable control element 214 in any combination, thereby giving rise to corresponding variations in the geometry (e.g., size, shape and/or depth), arrangement and/or number of first, second, third and/or fourth stage passageways; and 3) variations in the size (e.g., length and/or diameter) of the rotatable control element 214. As will be recognized, the implementation of any of these variations in any combination may be occasioned by prescribed choke valve performance criteria.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A control valve comprising:
   a valve body having a main valve passageway;
   a flow control element positioned within the main valve passageway, the flow control element having a first stage passageway and a second stage passageway; and
   a rotatable control element positioned in the main valve passageway adjacent the flow control element, the rotatable control element having a first stage opening and a second stage opening, the rotatable control element being transitional relative to the flow control element between a closed position, a first position, and a second position;
   in the closed position, all openings in the rotatable control element are out of alignment with all passageways in the flow control element, such that the rotatable control element blocks fluid flow through the flow control element;
   in the first position, the first stage opening is at least partially aligned with the first stage passageway and the second stage opening is out of alignment with the second stage passageway, such that the rotatable control element allows fluid flow through the first stage passageway and blocks the second stage passageway to prevent fluid flow therethrough; and
   in the second position, the first stage opening is aligned with the first stage passageway and the second stage opening is at least partially aligned with the second stage passageway, such that the rotatable control element allows fluid flow through both the first stage passageway and the second stage passageway.

2. The control valve of claim 1, wherein the flow control element includes a plurality of first stage passageways and the rotatable control element includes a plurality of first stage openings, each first stage opening being associated with a respective one of the plurality of first stage passageways.

3. The control valve of claim 2, wherein the flow control element includes plurality of second stage passageways and the rotatable control element includes a plurality of second stage openings, each second stage opening being associated with a respective one of the plurality of second stage passageways.

4. The control valve of claim 3, wherein the plurality of first stage openings each extend along a path which is spaced from a central axis by a first radial distance and the plurality of second stage openings each extend along a path which is spaced from the central axis by a second radial distance different from the first radial distance.

5. The control valve of claim 1, wherein the flow control element includes a central body and at least one sleeve extending around the central body, the sleeve and the central body collectively defining the first stage passageway and the second stage passageway.

6. The control valve of claim 5, wherein the at least one sleeve includes a plurality of sleeves arranged in concentrically nested relation relative to each other.

7. The control valve of claim 6, wherein the first stage passageway is collectively defined by the central body and one of the plurality of sleeves, and the second stage passageway is collectively defined by adjacent ones of the plurality of sleeves.

8. The control valve of claim 1, wherein the flow control element includes a plurality of stacked discs collectively defining the first stage passageway and the second stage passageway.

9. The control valve of claim 1, further comprising a handle coupled to the rotatable control element to facilitate manual control of the position of the rotatable control element relative to the flow control element.

10. The control valve of claim 9, wherein the valve body includes a slot, the handle extending through slot.

11. The control valve of claim 1, wherein the valve body includes an inlet and an outlet, the main valve passageway extending between the inlet and the outlet, the rotatable control element being positioned upstream relative to the flow control element.

12. A control valve comprising:
    a valve body having a main valve passageway; and
    a flow control assembly positioned in the main valve passageway, the flow control assembly including a first control element, and a second control element rotatable relative to the first control element between a closed position, a first position, and a second position;
    in the closed position, the first and second control elements forming a plug which prevents fluid flow through the flow control assembly;
    in the first position, the first and second control elements collectively defining a first control passageway therethrough; and
    in the second position, the first and second control elements collectively defining the first control passageway and a second control passageway therethrough;
    the second control passageway having at least two segments that are out of communication with each other so as to prevent fluid flow through the second control passageway when the flow control assembly is in the first position.

13. The control valve of claim 12, wherein the flow control assembly defines a plurality of first control passageways when the second control element is in the first position.

14. The control valve of claim 13, wherein the flow control assembly defines a plurality of second control passageways when the second control element is in the second position.

15. The control valve of claim 12, wherein the first control element of the flow control assembly includes a central body and at least one sleeve extending around the central body and collectively defining at least a portion of the first control passageway and the second control passageway.

16. The control valve of claim 15, wherein the at least one sleeve includes a plurality of sleeves in arranged in concentrically nested relation relative to each other.

17. The control valve of claim 16, wherein at least a portion of the first control passageway is collectively defined by the central body and one of the plurality of sleeves, and at least a portion of the second stage passageway is collectively defined by adjacent ones of the plurality of sleeves.

18. The control valve of claim 12, wherein the first control element includes a plurality of stacked discs.

19. The control valve of claim 12, further comprising a handle coupled to the flow control assembly to facilitate manual control of the position of the second control element relative to the first control element.

20. The control valve of claim 19, wherein the valve body includes a slot, the handle extending through slot.

21. The control valve of claim 12, wherein at least one of the first control passageway and the second control passageway extends along at least two axes.

* * * * *